(12) United States Patent
Haskell et al.

(10) Patent No.: US 6,252,999 B1
(45) Date of Patent: Jun. 26, 2001

(54) PLANAR REFLECTIVE LIGHT VALVE BACKPLANE

(75) Inventors: Jacob Daniel Haskell, Palo Alto; Rong Hsu, Cupertino, both of CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/219,617

(22) Filed: Dec. 23, 1998

(51) Int. Cl.[7] ................................................. G02B 6/12
(52) U.S. Cl. .......................... 385/14; 385/129; 385/130; 385/131
(58) Field of Search ............................. 385/1, 3, 14, 15, 385/18, 129, 130, 131

(56) References Cited

U.S. PATENT DOCUMENTS

| | | | |
|---|---|---|---|
| 4,832,789 | 5/1989 | Cochran et al. | 156/644 |
| 5,009,476 | * 4/1991 | Reid et al. | 385/14 X |
| 5,373,570 | * 12/1994 | Menigaux et al. | 385/14 |
| 5,486,485 | 1/1996 | Kim et al. | 437/41 |
| 5,640,479 | * 6/1997 | Hegg et al. | 385/120 |
| 5,868,951 | 2/1999 | Schuck, III et al. | 216/24 |
| 5,894,538 | * 4/1999 | Presby | 385/129 |
| 5,960,132 | * 9/1999 | Lin | 385/18 |
| 5,963,682 | * 10/1999 | Dorschner et al. | 385/16 |

* cited by examiner

*Primary Examiner*—Brian Healy
(74) *Attorney, Agent, or Firm*—Henneman & Saunders; Larry E. Henneman, Jr.

(57) ABSTRACT

A planar wafer based device (e.g., a reflective light valve backplane) includes a substrate having a plurality of surface projections (e.g., pixel mirrors) defining gaps therebetween, an etch-resistant layer formed on the substrate, and a fill layer formed on a portion of the etch-resistant layer in the gaps. In a particular embodiment, the fill layer is a spin-on coating. An optional protective layer formed on the exposed portions of the etch-resistant layer and the fill layer protects the underlying layers during subsequent processing steps.

34 Claims, 6 Drawing Sheets

PLANAR REFLECTIVE LIGHT VALVE BACKPLANE

BACKGROUND OF THE INVENTION

1. Field of the Invention

This invention relates generally to planarized, wafer-based integrated circuits, and more particular ly to a novel planar integrated circuit having optical elements disposed on its surface.

Even more particularly the invention relates to a novel, planar, wafer-based reflective light valve backplane.

2. Description of the Background Art

Wafer-based reflective light valves have many advantages over their transmissive predecessors. For example, conventional transmissive displays are based on thin-film transistor (TFT) technology whereby the displays are formed on a glass substrate, with the TFTs disposed in the spaces between the pixel apertures. Placing the driving circuitry between the pixel apertures limits the area of the display available for light transmission, and therefore limits the brightness of transmissive displays. In contrast, the driving circuitry of reflective displays is located under reflective pixel mirrors, and does not, therefore, consume valuable surface area of the display. As a result, reflective displays are more than twice as bright as their transmissive counterparts.

Another advantage of wafer-based reflective displays is that they can be manufactured with standard CMOS processes, and can therefore benefit from modern submicron CMOS technology In particular, the reduced spacing between pixel mirrors increases the brightness of the display, and reduces the pixelated appearance of displayed images. Additionally, the CMOS circuitry switches at speeds one or more orders of magnitude faster than comparable TFT circuitry, making wafer-based reflective displays well suited for high speed video applications such as projectors and camcorder view finders.

FIG. 1 is a cross-sectional view of a prior art reflective display backplane 100, which is formed on a silicon substrate 102, and includes a layer 104 of integrated circuitry, an insulating support layer 106, a plurality of pixel mirrors 108, and a protective oxide layer 110. Each of pixel mirrors 108 is connected, through an associated via 112, to the circuitry of layer 104. Backplane 100 is typically incorporated into a reflective light valve (e.g., a liquid crystal display) by forming a layer 114 of an optically active medium (e.g., liquid crystal) over the pixel mirrors, and forming a transparent electrode (not shown) over the optically active medium. Light passing through the medium is modulated (e.g., polarization rotated), depending on the electrical signals applied to pixel mirrors 108.

One problem associated with prior reflective displays is that the generated images often appear mottled. One source of mottling in reflective displays is the non-uniform alignment of the liquid crystals in layer 114. The formation of liquid crystal layer 114 typically includes a wiping or rubbing step, wherein a roller or similar object is passed over the liquid crystal layer, resulting in alignment of the liquid crystals. However, pixel mirrors 108 project upward from the surface of backplane 100, defining gaps between adjacent pixel mirrors. Known wiping processes are ineffective to align the liquid crystals (represented by arrows in layer 114) in these gaps. Additionally, the misaligned crystals adversely affect the alignment of neighboring crystals in layer 114.

What is needed is a reflective backplane with a planar surface to facilitate the effective alignment of the entire liquid crystal layer.

In many cases (e.g., substrates including optical elements) it is necessary to maintain strict control over the thickness of films remaining on the surface, because the thickness of films over optical elements is often critical to the proper optical functionality of the element.

What is also needed, therefore, is a method for planarizing the surface of substrates having optical elements disposed on their surface, while maintaining control over the thickness of any layers remaining, over the optical elements.

SUMMARY

The present invention overcomes the limitations of the prior art by providing a novel wafer based device (e.g., a reflective display backplane) including a plurality of surface projections (e.g., pixel mirrors) and a fill layer filling the gaps between the surface projections. Together, the surface projections and the fill layer form a planar surface of the device. Where the substrate is a reflective display backplane, the resulting planar surface facilitates the effective alignment of liquid crystal materials deposited thereon.

A disclosed embodiment includes a substrate having a plurality of surface projections defining gaps therebetween,- an etch-resistant layer formed on the substrate, and a fill layer formed on a portion of the etch-resistant layer in the gaps. In a particular embodiment, the substrate is an integrated circuit, and the surface projections are optical elements. In a more particular embodiment, the substrate is a reflective display backplane, and the surface projections are pixel mirrors.

In one embodiment, the fill layer is a spin-on-coating, for example spin-on-glass. Optionally, the fill layer can be doped with a light absorbing dopant, such as colored dye.

The etch-resistant layer may include an optical thin film layer, and may be formed as a single layer. Optionally, the etch-resistant layer includes a plurality of sublayers, for example an optical thin film layer and an etch-resistant cap layer. In one embodiment, the optical thin film layer is an oxide layer, and the etch-resistant cap layer is a nitride layer.

A more particular embodiment further includes an optional protective layer formed over the etch-resistant layer and the fill layer. The protective layer may be formed as a single layer or, optionally, may include a plurality of sublayers. For example, in a disclosed embodiment, the protective layer includes an oxide layer and a nitride layer.

The protective layer also fills in any step-down from the top surface of the etch-resistant layer overlying the pixel mirrors and the top surface of the fill layer remaining in the gaps, formed by over-etching the fill layer. Where the step-down is less than or equal to 1200 Å, the protective layer is sufficient to fill the step-down and form a planar surface on the wafer-based device.

BRIEF DESCRIPTION OF THE DRAWINGS

The present invention is described with reference to the following drawings, wherein like reference numbers denote substantially similar elements.

DETAILED DESCRIPTION

This patent application is related to the following co-pending patent applications, filed on even date herewith and assigned to a common assignee, each of which is incorporated herein by reference in its entirety:

Method For Manufacturing A Planar Reflective Light Valve Backplane, U.S. patent application Ser. No. 09/219,579, pending by Jacob D. Haskell and Rong Hsu; and Combination CMP-Etch Method For Forming A Thin Planar Payer Over The Surface Of A Device. U.S. patent application Ser. No. 09/220,814, pending, by Jacob D. Haskell and Rong Hsu.

The present invention overcomes the problems associated with the prior art, by providing a planar wafer-based device (e.g., a reflective display backplane) including a substrate having a plurality of surface projections (e.g. pixel mirrors) and a fill layer filling the gaps between the surface projections. Specifically, the present invention describes a wafer-based reflective light-value backplane having a planar reflective surface which reduces mottling in generated images. In the following description, numerous specific details are set forth (e.g., specific compositions and thicknesses of optical, etch-resistant, and protective layers) in order to provide a thorough understanding of the invention. Those skilled in the art will recognize, however, that the invention may be practiced apart from these specific details. In other instances, well known details of semiconductor processing and optical thin film coatings have been omitted, so as not to unnecessarily obscure the present invention.

Figure 2:
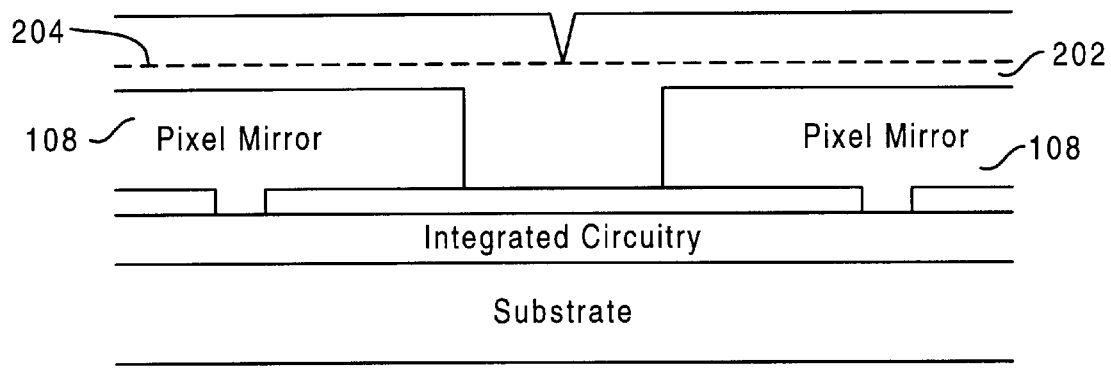
FIG. 2 is a cross-sectional view of a reflective light-valve backplane having a thick protective layer deposited thereon.

FIG. 2 is a cross sectional view of a reflective backplane 200, illustrating one method of planarizing the surface of reflective backplane 200 by depositing a thick protective oxide layer 202 and then etching layer 202 back to a desired thickness level 204. In particular, as oxide layer 202 is deposited, the gap between pixel mirrors 108 is filled. Thus, oxide layer 202 functions as a fill layer. Oxide layer 202 is then etched back to level 204, leaving a planar surface over backplane 300. This method is effective to planarize the surface of backplane 200, but suffers from the disadvantage that it is difficult to control the thickness of layer 202 remaining over pixel mirrors 108 following the etch step.

Figure 1:
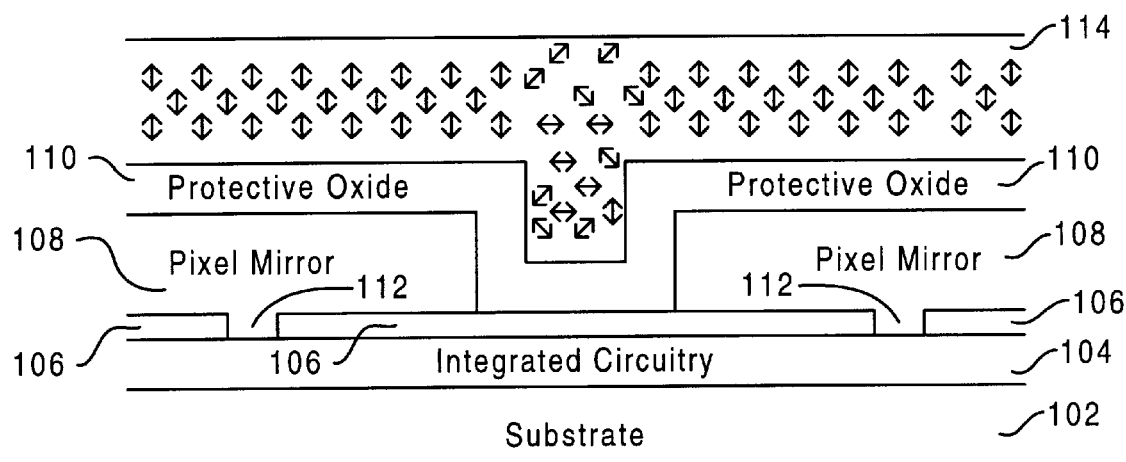
FIG. 1 is a cross-sectional view of a prior art reflective light-valve backplane.
Figure 3:
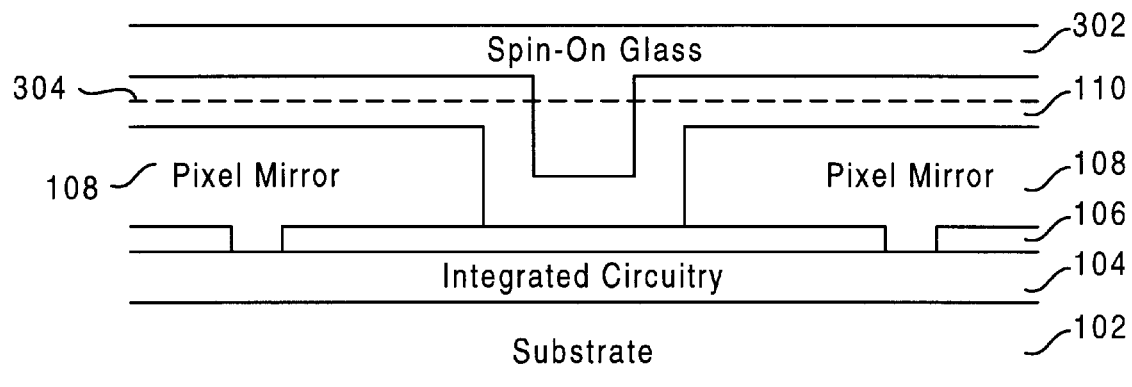
FIG. 3 is a cross sectional view of a reflective light-valve backplane, illustrating one planarization technique.

FIG. 3 is a cross sectional view of a reflective display backplane 300 formed by plaliarizing the surface of reflective backplane 100 shown in FIG. 1, according to another method of the present invention. Backplane 300 is planarized by applying a fill layer 302 (e.g., spin-on glass) over protective oxide layer 110. After its application, fill layer 302 is etched back to a level 304, leaving the fill layer disposed in the gap between pixel mirrors 108 and an oxide layer overlying pixel mirrors 108. This method of planarizing the surface of reflective backplane 300 also suffers from the disadvantage that it is difficult to control the thickness of protective oxide layer 110 remaining over pixel mirrors 108 following the etch back.

Figure 4:
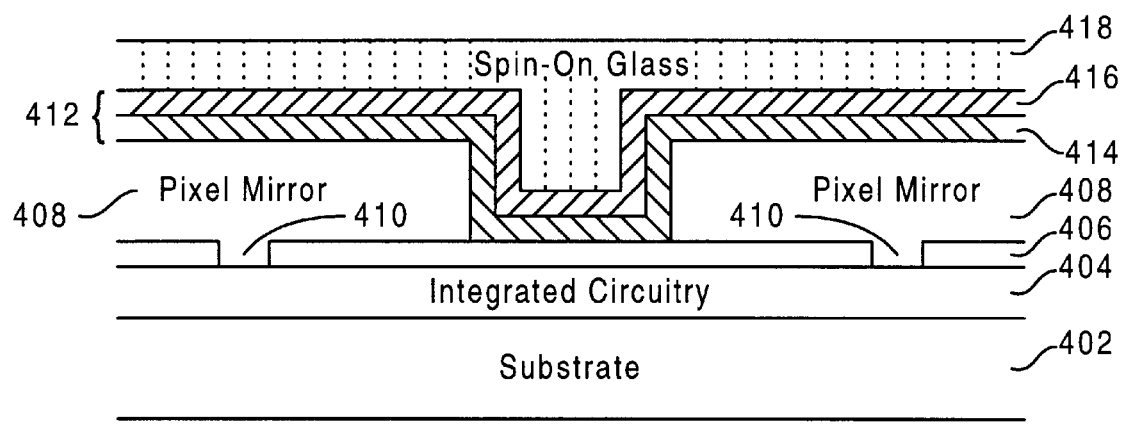
FIG. 4 is a cross-sectional view of a reflective light-valve backplane having an etch-resistant layer and a fill layer deposited thereon.

FIG. 4, is a cross sectional view of a reflective backplane 400 during the first steps of another novel planarization process according to the present invention. Reflective backplane 400 is formed on a silicon substrate 402 which includes a layer 404 of integrated circuitry, an insulating support layer 406, and a plurality of pixel mirrors 408. Integrated circuitry layer 404 receives display data from a data source (not shown) and controls the assertion of the display data on pixel mirrors 408. Insulating support layer 406 provides support for pixel mirrors 408 and insulates pixel mirrors 408 from integrated circuitry layer 404. Each pixel mirror 408 is coupled to integrated circuitry layer 404 by an associated via 410 through support layer 406.

During the first step of the planarization process an etch-resistant layer 412 is formed over pixel mirrors 408 and over portions of insulating support layer 406 exposed by the gaps between pixel mirrors 408. Etch-resistant layer 412 includes an optical thin film layer 414 and an etch-resistant cap layer 416. Optical thin film layer 414 optimizes the reflective performance of pixel mirrors 408 via thin film interference. Using means well known to those skilled in the optical arts, the thicknesses of such films are engineered to reinforce the refection of desirable wavelengths of light through constructive interference, and to inhibit unwanted reflections through destructive interference. The thickness of a thin film optical coating is, therefore, critical to its functionality.

Etch-resistant cap layer 416 protects optical thin film layer 414 from subsequent processing etches, insuring that its thickness remains unchanged. Additionally, etch-resistant cap layer 416 also functions as an optical thin film layer. Those skilled in the art will understand, therefore, that etch-resistant layer 412 including optical thin film layer 414 may also be properly understood to be an optical thin film coating 412 including etch resistant cap layer 416.

In a particular embodiment optical thin film layer 414 is formed by depositing silicon oxide to a thickness of 680Å (±10%). Etch-resistant cap layer 416 is formed by depositing silicon nitride to a thickness of 820 Å(±10%). Those skilled in the art will recognize, however, that optical thin film coatings of varying compositions and thicknesses may be substituted for optical thin film layer 414. Similarly, etch-resistant cap layers of varying thicknesses and compositions may be substituted for etch-resistant cap layer 416. In an alternate embodiment, etch-resistant layer 412 is formed as a single layer of a material (e.g., nitride) which is both etch-resistant and functional as an optical thin film.

During the next step in the planarization process, a fill layer 418 is deposited over etch-resistant layer 412. In a particular embodiment, fill layer 418 is formed with a spin-on glass material (e.g., Dow Corning product C2052154D SOG FOX-15), using methods well known to those skilled in the art of silicon processing. Preferably, the fill material has a low dielectric constant (e.g., on the order of 3.0), so as to minimize the electrical coupling between adjacent pixel mirrors.

Figure 5:
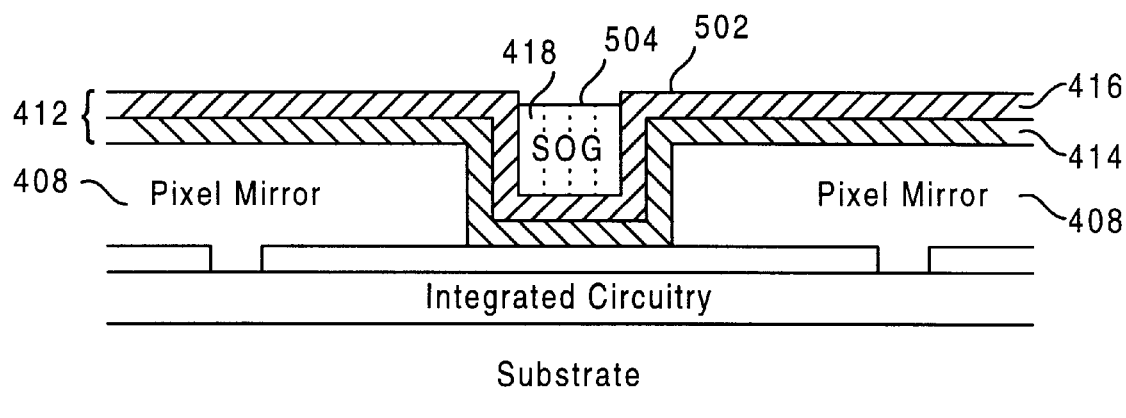
FIG. 5 is a cross-sectional view of the reflective light-valve backplane of FIG. 4, after a selective etch of the deposited fill layer.

FIG. 5 shows a cross sectional view of reflective backplane 400 following an etching step wherein fill layer 418 is etched for a period of time sufficient to expose portions of etch-resistant layer 412 overlying pixel mirrors 408, but leaving portions of fill layer 418 in the gap between pixel mirrors 408. Either a wet chemical etch (e.g., hydrofluoric acid) or a dry etch (e.g., plasma etch) may used to perform the etch step, but the wet etch exhibits greater selectivity between the etch-resistant layer and the fill layer.

Because etch-resistant layer 412 is resistant to the etchant used to remove fill layer 418, over etching fill layer 418 will not effect the thickness of etch-resistant layer 412, particularly optical thin film layer 414. Over etching fill layer 418 will, however, result in the removal of a portion of fill layer 418 from the gap between pixel mirrors 408, creating a step down from the top surface 502 of etch-resistant layer 416 to the top surface 504 of fill layer 418. A step down of less than or equal to 1200 Å is acceptable, and will be filled by the formation of subsequent layers as described below.

Figure 6:
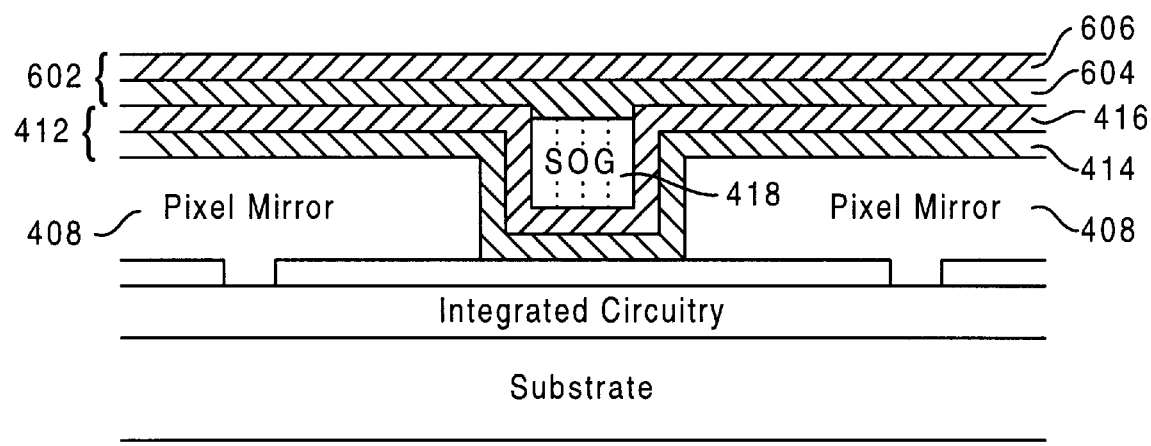
FIG. 6 is a cross-sectional view of the reflective light-valve backplane of FIG. 5, having a protective layer deposited thereon.

FIG. 6 is a cross sectional view of reflective backplane 400 following the deposition of a protective layer 602. Protective layer 602 includes an oxide layer 604 and a nitride layer 606. Oxide layer 604 is formed over etch-resistant layer 412 and fill layer 418, and fills in the step down from etch-resistant cap layer 416 to fill layer 418, so long as the step down is less than or equal to 1,200 Å. Nitride layer 606 is formed on oxide layer 604. The portion of oxide layer 604 overlying pixel mirrors 408 has a thickness of 680 Å (±10%), and nitride layer 606 has a thickness of 1,200 Å (±10%).

protective layer 602 makes the surface of reflective backplane 400 more robust, so as to be able to withstand further processing in the construction of a reflective light valve. For example, in constructing a liquid crystal display, a polyimide coating is physically wiped onto the reflective backplane. Without a protective coating, this wiping step would destroy the reflective backplane.

Protective layer 602 also functions as an optical thin film coating. Further, protective layer 602 and etch-resistant layer 412 may be considered to form a multilayered optical thin film coating. The use of Such multilayered coatings typically results in better optical performance over a wider optical spectrum.

Those skilled in the art will recognize that alternative protective coatings may be substituted for protective layer 602. For example, oxide layer 604 and nitride layer 606 could be replaced with a single protective layer of, for example, a doped oxide or a silicon-oxy-nitride. Alternatively, an optical coating including many sub-layers engineered to obtain the desired optical performance may be substituted for protective layer 602, so long as the multi-layered coating possesses the desired ruggedness.

Reflective display backplane 400 is superior to prior art reflective backplanes for a number of reasons. First, the planar surface of reflective backplane 400 eliminates spurious reflections of light off of the lateral edges of pixel mirrors 408. Second, the robust planar surface of reflective backplane 400 facilitates the easy application of subsequently applied display materials, for example, polyimide and/or liquid crystal material. Further, the planar surface facilitates the uniform alignment of the applied liquid crystals. Additionally, reflective backplane 400 can be manufactured entirely by standard silicon manufacturing procedures, and may, therefore, be inexpensively manufactured by existing silicon manufacturing facilities.

Figure 7:
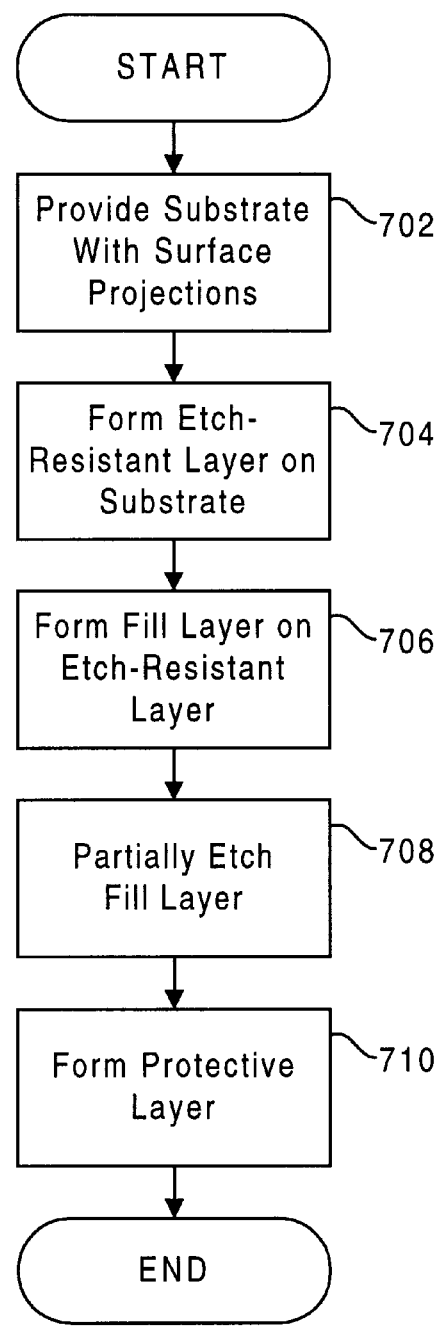
FIG. 7 is a flow chart summarizing a method of forming a planarized a wafer-based integrated circuit according to the present invention.

FIG. 7 is a flow chart summarizing a method 700 of forming a planarized, wafer-based device according to the present invention. Method 700 includes a first step 702 of providing a substrate with surface projections. In a particular embodiment, the substrate is a reflective display backplane and the projections are pixel mirrors, but those skilled in the art will recognize that the present invention may be embodied in other devices, for example, other integrated circuits having optical elements disposed on their surfaces.

Next, in a second step 704, an etch-resistant layer is formed on the substrate including the surface projections and the gaps defined therebetween. Those skilled in the art will recognize that the etch-resistant layer formed in second step 704 may include a number of sublayers. For example, as described above with reference to FIGS. 4 through 6, the etch-resistant layer may be formed by first applying one or more optical thin film layers, and then forming an etch-resistant cap layer over the optical thin film layer.

Next, in a third step 706, a fill layer is formed over the etch-resistant layer. The fill layer is formed sufficiently thick to fill the gaps between the pixel mirrors and cover the etch-resistant layer overlying the pixel mirrors.

Next in a fourth step 708, the fill layer is etched back to expose the portions of the etch-resistant layer overlying the surface projections, but leaving the portions of the fill layer in the gaps between the surface projections.

Finally, in a fifth step 710, a protective layer is formed over the exposed etch-resistant layer and the fill layer disposed in the gaps between the surface projections. The protective layer serves as both a passivation layer and physical protection layer. In a particular method the protective layer includes multiple sublayers, and fifth step 710 includes the substeps of forming each of the respective sublayers. For example, as disclosed with reference to FIG. 6, protective layer 602 if formed by first forming an oxide layer 604 and then forming a nitride layer 606 on oxide layer 604.

Figure 8:
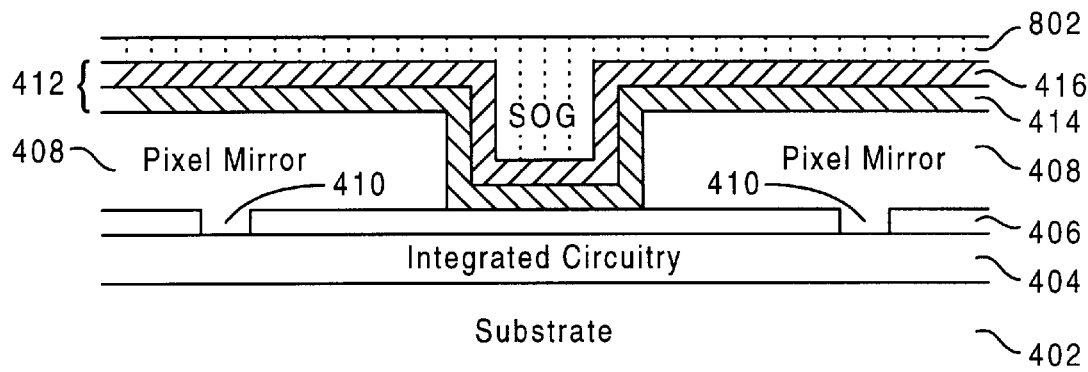
FIG. 8 is a cross-sectional view of a reflective light-valve backplane planarized according to another method of the present invention.

FIG. 8 is a cross-sectional view of a planar reflective backplane 800 formed by an alternate planarization method, wherein no etch step is required. Instead, a fill layer 802 is formed over layer 416, so as to fill the interpixel gaps, and also to form a part of the multilayered coating overlying pixel mirrors 408. In this particular embodiment, fill layer 802 is a spin-on coating. The thickness of the portion of layer 802 overlying pixel mirrors 408 is controlled by adjusting the viscosity of the spin-on material, the spin speed, and the process temperature. For example applying a spin-on glass material available from Dow Corning as material number C2052154D SOG FOX-15, at a spin speed of 2,200 RPM, forms a fill layer having a thickness of approximately 3,580 Å.

In this particular embodiment, layer 414 is a 750 Å oxide layer, layer 416 is a 615 Å nitride layer, and the portion of fill layer 802 over pixel mirrors 408 is a 1,000 Å spin-on glass layer. Those skilled in the art will recognize, however, that because there is no etch step involved in this planarization process, layer 416 need not be etch resistant, and that layers 414 and 416 can, therefore, be substituted for or omitted.

Figure 9:
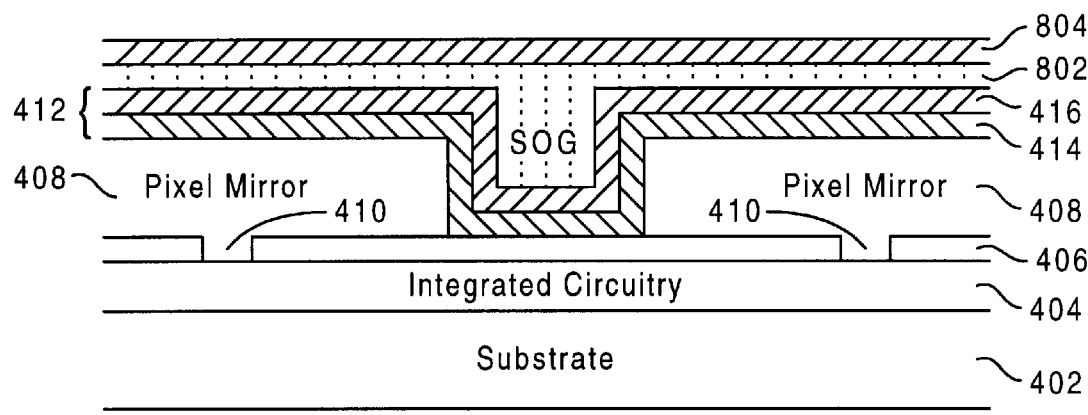
FIG. 9 is a cross-sectional view of the reflective light-valve backplane of FIG. 8, having a protective layer deposited thereon.

FIG. 9 is a cross-sectional view showing reflective backplane 800 with a protective layer 804 deposited over fill layer 802. Protective layer 804 provides added durability to reflective backplane 800, and forms the fourth layer in a multi-layered optical coating including layers 414, 416, 802, and 804. In the particular embodiment shown in FIG. 8 and FIG. 9, protective layer 804 is a 1190 Å nitride layer. Those skilled in the optical arts will understand that the thicknesses and compositions of layers 414, 416, 802, and 804 can be adjusted to enhance or subdue particular portions of the optical spectrum.

Figure 10:
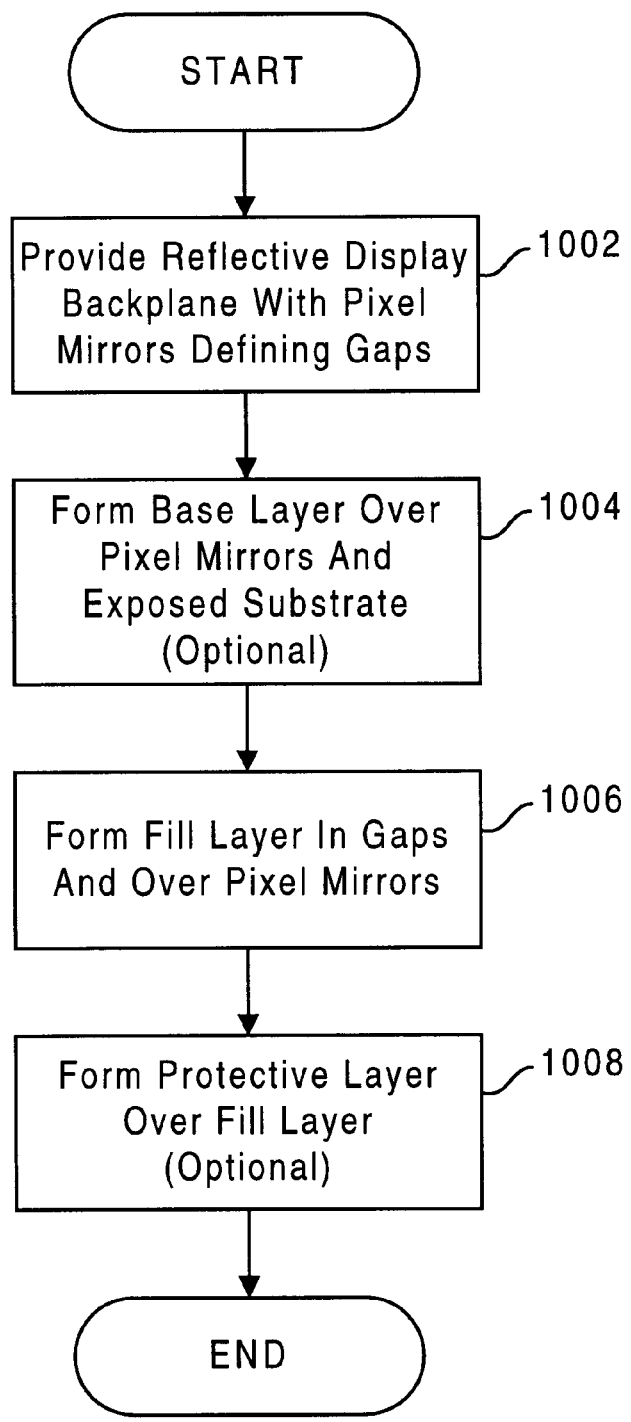
FIG. 10 is a flow chart summarizing the method of forming the reflective light-valve backplane of FIG. 9.

FIG. 10 is a flow chart summarizing one method 1000 of planarizing a reflective backplane, without the necessity of an etch step. In a first step 1002, a reflective display backplane with pixel mirrors defining gaps therebetween is provided for planarization. Those skilled in the art will understand that method 1000 is only one particular method of practicing the present invention, and that the method of the present invention is also applicable to other useful to planarize other devices having optical elements disposed on their surfaces.

Next, in a second step 1004, a base layer (e.g., layer 412) is formed over pixel mirrors 408 and the portions of support layer 406 exposed by the gaps between pixel mirrors 408. Because method 1000 does not require an etch step, the base layer need not be etch resistant. The material and thickness of the base layer may, therefore, be selected purely based on its intended function (e.g., passivation, optical properties, etc.). In fact, as long as the materials of pixel mirrors 408 and fill layer 802 are compatible, the base layer may be omitted, and should therefore be considered optional.

Then, in a third step 1006, fill layer 802 is formed over the base layer to fill the gaps between pixel mirrors 408. In this particular method, fill layer 802 is formed by applying a spin-on coating (e.g., spin-on glass). The parameters of the spin-on process (e.g., spin speed, material viscosity, temperature. etc.) are adjusted to control the thickness of the portion of fill layer 802 overlying pixel mirrors 408.

Finally, in a fourth step 1008, protective layer 804 is formed over fill layer 802. As indicated above, protective layer 804 provides added ruggedness and durability to reflective backplane 800, to facilitate, among other the things, the wiping step associated with the application of liquid crystal material. However, if fill layer 802 is sufficient rugged, protective layer 804 can be omitted, and fourth step 1008 is, therefore, optional.

Those skilled in the art will understand that all layers formed over pixel mirrors 408 affect the optical performance of reflective backplane 800, and therefore serve, to some extent, as an optical coating. Some layers in this multilayered coating provide additional functions (e.g., passivation, protection, etc.), and those layers' positions are therefore dictated by their associated function. Other layers, however, are provided purely for optical purposes, and can, therefore, be disposed either above or below fill layer 802.

Accordingly, the particular disposition of fill layer 802 is not considered to be an essential element of the present invention. For example, planar devices may be formed by depositing protective layer 602 directly over etch resistant layer 412, and then depositing fill layer 418 over layer 412. As long as layer 602 is also etch resistant, the thicknesses of layers 412 and 602 will be maintained during subsequent etch steps. If subsequent etch steps are unnecessary, protective layer 602 need not be etch resistant.

The description of particular embodiments of the present invention is now complete. Many of the described features may be substituted, altered or omitted without departing from the scope of the invention. For example, a fill layer may be formed from other than a spin-on material. Additionally, a material of suitable strength and durability may be used in forming the etch-resistant layer, Such that the additional formation of the protective layer may be omitted. Further, the present invention is not limited to reflective display backplanes. Rather, the invention may be embodied in any device where a planar surface is desirable over a substrate having a plurality of surface projections while maintaining the thickness of layers formed over the projections, or maintaining the thickness of the projections themselves.

We claim:

1. An integrated electronic device comprising:
   a substrate including a plurality of surface projections defining gaps therebetween;
   an etch-resistant layer formed on said substrate; and
   a fill layer formed on a portion of said etch-resistant layer in said gaps.

2. An integrated electronic device according to claim 1, wherein:
   said substrate comprises an integrated circuit; and
   said projections comprise optical elements.

3. An integrated electronic device according to claim 2, wherein:
   said substrate comprises a reflective display backplane; and
   said projections comprise pixel mirrors.

4. An integrated electronic device according to claim 3, wherein said etch-resistant layer includes an optical thin film layer.

5. An integrated electronic device according to claim 4, wherein said etch-resistant layer further includes an etch-resistant cap layer over said optical thin film layer.

6. An integrated electronic device according to claim 5, wherein said etch-resistant cap layer is optically inactive.

7. An integrated electronic device according to claim 5, wherein said etch-resistant cap layer comprises a nitride layer.

8. An integrated electronic device according to claim 5, wherein said etch-resistant cap layer has a thickness in the range of 640 Å (±10%).

9. An integrated electronic device according to claim 4, wherein said optical thin film layer comprises an oxide layer.

10. An integrated electronic device according to claim 9, wherein said oxide layer has a thickness in the range of 750 Å (±10%).

11. An integrated electronic device according to claim 9, wherein said etch-resistant layer further comprises an etch-resistant cap layer.

12. An integrated electronic device according to claim 11, wherein said etch-resistant cap layer comprises a nitride layer.

13. An integrated electronic device according to claim 12, wherein:
   said oxide layer has a thickness in the range of 750 Å (±10%), and
   said nitride layer has a thickness in the range of 640 Å (±10%).

14. An integrated electronic device according to claim 4, wherein said optical thin film layer has a thickness in the range of 750 Å (±10%).

15. An integrated electronic device according to claim 3, further comprising a protective layer disposed over said etch-resistant layer and said fill layer.

16. An integrated electronic device according to claim 15, wherein said protective layer comprises an oxide layer.

17. An integrated electronic device according to claim 16, wherein said protective layer further comprises a nitride layer disposed over said oxide layer.

18. An integrated electronic device according to claim 17, wherein said nitride layer has a thickness in the range of 1,200 Å (±10%).

19. An integrated electronic device according to claim 16, wherein said oxide layer has a thickness in the range of 840 Å (±10%).

20. An integrated electronic device according to claim 16, wherein said protective layer further comprises a nitride layer disposed over said oxide layer.

21. An integrated electronic device according to claim 20, wherein:

said oxide layer has a thickness in the range of 840 Å (±10%); and said nitride layer has a thickness in the range of 1,200 Å (±10%).

22. An integrated electronic device according to claim 3, wherein said fill layer comprises a spin-on-coating.

23. An integrated electronic device according to claim 22, wherein said fill layer comprises spin-on-glass.

24. An integrated electronic device according to claim 22, wherein said fill layer comprises a light absorbing dopant.

25. An integrated electronic device according to claim 24, wherein said dopant comprises dye.

26. An integrated electronic device according to claim 3, wherein the elevational difference between a top surface of said etch-resistant layer overlying said pixel mirrors and a top surface of said fill layer remaining in said gaps, is less than or equal to 1,200Å.

27. A reflective display backplane comprising:

a plurality of pixel mirrors defining gaps therebetween; and a fill layer formed in said gaps to planarize the surface of said reflective display backplane.

28. A reflective display backplane according to claim 27, wherein a portion of said fill layer overlies said pixel mirrors.

29. A reflective display backplane according to claim 28, wherein said fill layer comprises a spin-on coating.

30. A reflective display backplane according to claim 29, wherein said fill layer comprises spin-on glass.

31. A reflective display backplane according to claim 27, wherein said fill layer comprises a spin-on coating.

32. A reflective display backplane according to claim 31, wherein said fill layer comprises spin-on glass.

33. A reflective display backplane according to claim 27, further comprising a base layer disposed under said fill layer.

34. A reflective display backplane according to claim 33, wherein said base layer comprises:

a first oxide layer disposed over said pixel mirrors;

a first nitride layer disposed over said first oxide layer;

a second oxide layer disposed over said first nitride layer; and a second nitride layer disposed over said second oxide layer.

* * * * *